United States Patent [19]
Imaoka et al.
[11] 3,770,500
[45] Nov. 6, 1973

[54] MAGNETIC MATERIALS AND METHOD OF MAKING SAME

[75] Inventors: Yasuo Imaoka; Takeo Tada; Takashi Ishikawa; Tatsuo Uehori, all of Tokyo, Japan

[73] Assignee: TDK Electronics Company Ltd., Tokyo, Japan

[22] Filed: Aug. 26, 1970

[21] Appl. No.: 67,273

[30] Foreign Application Priority Data

| | | |
|---|---|---|
| Sept. 16, 1969 | Japan | 44/73388 |
| Oct. 29, 1969 | Japan | 44/86222 |
| Sept. 25, 1969 | Japan | 44/76468 |
| Oct. 31, 1969 | Japan | 44/87916 |

[52] U.S. Cl. .................. 117/237, 117/235, 117/240, 117/100 B
[51] Int. Cl. .................. H01f 10/00
[58] Field of Search .................. 117/235, 240, 160 R, 117/100 R, 237

[56] References Cited
UNITED STATES PATENTS

| | | | |
|---|---|---|---|
| 3,042,543 | 7/1962 | Schuele | 117/62 |
| 3,062,680 | 11/1962 | Meddings | 117/130 X |
| 3,147,154 | 9/1964 | Cole et al. | 117/62 X |
| 3,046,158 | 7/1962 | Fukuda et al. | 117/28 X |
| 3,348,969 | 10/1967 | Katz | 117/160 |

*Primary Examiner*—William D. Martin
*Assistant Examiner*—Bernard D. Pianalto
*Attorney*—Clario Ceccon

[57] ABSTRACT

This invention relates to a magnetic material having particle cores of arbitrary configuration, the surface of which is coated with a layer of a ferromagnetic metal or alloy such as of Co or Ni or the like, having high coercive force and high magnetic flux density. When the particle cores are spicular, the spicular shape is maintained after the deposition of the ferromagnetic metals. The properties of the ferromagnetic material thus obtained are improved by heat treatment and are excellently usable as a magnetic recording medium and permanent magnets. The method of preparing the material comprises dispersing the particles in a solution containing metallic ions, heating the solution in a $H_2$ atmosphere at high pressures and heat-treating the resultant precipitate.

7 Claims, No Drawings

MAGNETIC MATERIALS AND METHOD OF MAKING SAME

This invention relates to magnetic materials with high coercive force and high magnetic flux density, and the manufacturing method thereof.

Various kinds of alloy magnets, ESD magnets, Ba-ferrite, Sr-ferrite and Co-ferrite are well-known as high coercive force magnets and their high coercive force characteristics are due to large magnetic crystal anisotropy or configuration anisotropy. Configuration anisotropy is defined as the anisotropy resulting from configurations such as needles or sticks and its demagnetizing factor Na in the axial direction is smaller than the demagnetizing factor Nb in the direction parpendicular to the axis, so that a coercive force proportional to (Nb-Na) is obtained. In some materials, the axis of configuration anisotropy coincides with the axis of magnetization due to magnetic crystal anistropy, so that the acicular particles of such materials have a rather large coercive force.

Magnetic acicular particles are used for magnetic recording. If the axis of the acicular particles is disposed so as to be coincident with the scanning direction of the head of the recorder, the recording sensitivity can be improved. The magnetic crystal anisotropy of ferromagnetic oxides of iron, such as magnetite ($Fe_3O_4$) or $\gamma \cdot Fe_2O_3$ is rather small, and hence configuration anisotropy is used to obtain a coercive force of several hundreds oersted necessary in magnetic recording tapes.

However, if higher density recording is demanded, a magnetic powder having a higher coercive force and a higher magnetic flux density is necessary. Moreover, in magnetic transcription techniques, i.e. magnetic reproductions of a plurality of printed tapes or sheets from an original tape or sheet, the coercive force of the magnetic material of the original tape or sheet has to be higher than that of the sheets to be printed. Because a force of several hundreds oersted of transcribing magnetic field is applied to the original tape in reproduction, so that the signals magnetically recorded on the original tape are progressively demagnetized whilethousands upon thousands of printed tapes are reproduced, a very high coercive force is necessary.

The length of the major axis of spicular $\gamma \cdot Fe_2O_3$ is generally less than $1\mu$, the ratio of the minor axis to the major axis is about 0.2 and the coercive force is about 350 oersted. It has already been proposed to dope the maghemite with a small amount of Co-ions to increase the anisotropy and coercive force, but the solid solution of maghemite and Co-ion obtained is not thermally stable and it is difficult to maintain a spicular configuration.

It is, therefore, an object of this invention to provide a magnetic material having high coercive force and high magnetic flux density. It is another object of this invention to provide a magnetic material having spicular configuration and high coercive force and magnetic flux density.

It is still another object of this invention to provide a manufacturing method for the above-mentioned materials.

The magnetic particles of this invention have improved characteristics which could not be obtained by the prior art, without due regard to their configuration, namely spicular, granular or amorphous. There are three important features in this invention, that is, (1) the minuteness of the crystals used for cores; (2) the metals to be deposited on the surface of cores; and (3) the particular method of deposition. Non-ferromagnetic spicular crystals such as spicular gaysite, kaolin, spicular cobalt oxalate, glass fiber, asbestos, lepidocrosite or rock wool are used for cores when it is desired to maintain a spicular configuration, while various kinds of clays and minerals are examples of granular or amorphous cores.

A core may be itself made of a magnetic substance. For instance, magnetite, maghemite, Fe-Co-Ni alloys, $CrO_2$, ESD-magnets, Fe-Co whiskers are spicular magnetic cores and magnetite, maghemite, Co-ferrite, solid solutions of Co-ferrite and maghemite (or maghetite), Ba-ferrite, spinel type ferrites, Fe-Co-Ni-alloys, Mn-Bi alloys are all used for granular magnetic cores. Alloys which contain a metal selected from the group consisting of Ni, Co and Cu are used as metal to be deposited.

Fine particles, serving as cores, are dispersed and suspended in a water solution containing ions of Ni, Co and Cu. It is necessary to adjust the pH value of this solution to the alkaline state in order to promote the reaction, and it is preferable to add surface active agents to sufficiently disperse the cores. The suspended solution is then charged to an autoclave, which is electrically heated, and hydrogen gas is introduced into the autoclave under a proper pressure so that the autoclave is maintained at an elevated temperature and a high pressure. Hydrogen is dissolved into the liquid phase and the ions of Ni, Co and Cu lose their charge and are deposited onto the surface of the cores. At the end of the reaction, the fine particles are filtered, washed in water and dried at room temperature. The particles containing Co or Ni alloy deposited on their surface are then heat-treated in an oxidizing atmosphere which may be a mixture of inert gas and oxygen. If the particles are made by depositing Co on the cores of iron oxide and are heat-treated in said atmosphere, Co-ferrite is produced under certain conditions and the reaction is promoted while the acicular configuration is preserved so that acicular particles of Co-ferrite can be produced. It was extremely difficult or almost impossible to obtain such acicular particles of Co-ferrite by the prior art processes.

When the Co or Ni alloy coated particles are heat-treated in a reducing atmosphere, the deposited alloy film becomes dense and stiff, and the magnetic properties of the particles are improved. In the case of deposition of said alloy onto the surface of iron oxide cores and heat-treating of the particles in a reducing atmosphere, ferromagnetic alloy particles composed of Fe-Co, Fe-Ni or Fe-Co-Ni are produced. In this case, too, under the proper reaction conditions, the reaction is promoted while the acicular configuration is preserved and acicular ferromagnetic alloy particles can be produced.

This invention will be more clearly understood by reference to the following examples.

Example 1.

35 grams of a special grade of $CoSO_4 \cdot 7H_2O$ were dissolved into 500 cc of distilled water. 80 cc of first grade 12 N ammonia water was poured into a vessel and the above-mentioned $CoSO_4$ solution, pH 11.5 at 25° C, was added to said ammonia water. 5 grams of acicular hematite, whose major axis was about $0.8\mu$ and with an acicular ratio of 6, were prepared as cores and 0.2 grams of anthraquinone were added thereto and the mixture was kneaded with a small amount of water in a mortar. After kneading, about 10 cc of water were added and a slurry-like mass was obtained. The slurry was added to the initial solution and mixed together. After mixing, the mixture was charged to a 1 liter autoclave of stainless steel, air was exhausted by a vacuum pump and hydrogen gas was introduced until a pressure of 50 atmospheres was reached.

Then the autoclave was heated with an electric furnace and its contents were stirred at a pressure of 130 atmospheres and 300° C for 2 hours. When the reaction was finished, the products were water-cooled and removed from the autoclave. The particles obtained were filtered, washed and dried at room temperature. The product had a black acicular crystalline structure and its magnetic properties were: Hc 970 oe (oersted), Br/$\rho$ 350 emu/g, Bm/$\rho$ 750 emu/g, Rs 0.47 and the spinel phase, the hematite phase and the $\alpha$-Co phase were all detected by X-ray analysis. Of course, Hc is the coercive force, Br the remanent magnetic flux density, Bm the magnetic saturation value, $\rho$ the density of particles and Rs the rectangular ratio.

Example 2.

70 grams of special grade $CoSO_4 \cdot 7H_2O$ were dissolved into 500 cc of distilled water. 160 cc of first grade 12 N ammonia water was poured into a vessel and the above-mentioned $CoSO_4$ solution, pH 11.5 at 25° C, was added to said ammonia water. 10 grams of acicular $\gamma \cdot Fe_2O_3$, whose major axis was about 0.5$\mu$ and the acicular ratio was 8, were prepared as cores and mixed with 10 cc of distilled water, the mixture being then kneaded in a mortar. After kneading, the two solutions were combined and 0.2 gram of anthraquinone was added thereto. The mixture was charged to a 1 liter, stirrerless stainless steel autoclave, air was exhausted by a vacuum pump, and hydrogen gas was introduced until the pressure of 70 atmosphere was attained. Then the autoclave was heated to 300° C for 1 hour and water-cooled.

The product was black and confirmed by electron microscope to have preserved the original acicular configuration. The magnetic properties of the product were: Hc 1,300 oe, Br/$\rho$ 630 emu/g, Bm/$\rho$ 970 emu/g, Rs 0.65, and the spinel phase and $\alpha$-Co phase were detected by X-ray analysis.

Example 3.

70 grams of special grade $CoSO_4 \cdot 7H_2O$ were dissolved into 400 cc of distilled water. 300 cc of 12 N ammonia water was poured into a vessel and the above-mentioned $CoSO_4$ solution, pH 13.0 at 25° C, was added to said ammonia water.

15 grams of magnetite, whose major axis was about 0.5$\mu$ and with acicular ratio of 8, were prepared as cores, mixed with 0.3 grams of anthraquinone and the mixture was kneaded. The iron oxide suspended solution thus obtained was charged to a 1 liter stainless steel autoclave, air was exhausted by a vacuum pump, and hydrogen gas was introduced until a pressure of 49 atmospheres was attained.

The content of the autoclave was stirred by a stirrer and heated at 250° C for 3 hours, and then rapidly cooled. The magnetic powder in the reacted solution was filtered, washed and dried at room temperature. The product was black and its crystalline configuration was acicular as in the original configuration of the cores. The magnetic properties of the product were: Hc 980 oe, Br/$\rho$ 690 emu/g, Bm/$\rho$ 1,300 emu/g and Rs is 0.53.

Example 4.

35 grams of $CoSO_4 \cdot 7H_2O$, 35 grams of $NiSO_4 \cdot 7H_2O$, and 10 grams of $CuSO_4 \cdot 5H_2O$ were dissolved into 400 cc of distilled water. 150 cc of 12 N ammonia water were poured into a vessel and the above-mentioned solution, with its pH adjusted to 11.7 at 25° C, was added to said ammonia water and the mixture was stirred.

10 grams of magnetite, whose major axis was 0.5$\mu$ and the acicular ratio was 8, were mixed with 0.5 gram of carbon black in a mortar and sufficiently kneaded. After kneading, the previously mentioned solution was added thereto and the entire mixture of magnetite and carbon black was dispersed and suspended.

This suspended solution was charged to a 1 liter stainless steel autoclave, the air exhausted by a vacuum pump and hydrogen gas introduced until 50 atmospheres pressure were achieved. The content of the autoclave was stirred and heated at 350° C for 1 hour and then water-cooled. The reaction product was filtered, washed with water and cooled at room temperature. The product was black and confirmed by electron microscope to have preserved its original acicular configuration. The magnetic properties were: Hc 530 oe, Br/$\rho$ 1,000 emu/g, Bm/$\rho$ 1,900 emu/g and Rs 0.53. The spinel phase and the $\alpha$-Co phase were detected by X-ray analysis.

Example 5.

35 grams of $NiSO_4 \cdot 7H_2O$ were dissolved into 400 cc of distilled water. 100 cc of 12 N ammonia water were poured into a vessel and mixed and stirred sufficiently with the solution of $NiSO_4$ the pH of which was adjusted to 12.0.

10 grams of $\gamma \cdot Fe_2O_3$, whose major axis was 0.8$\mu$ and the acicular ratio was 6, were mixed with 0.3 gram of carbon black and a small amount of water and kneaded in a mortar. After kneading, the previously mixed solution was added thereto, so that $\gamma \cdot Fe_2O_3$ was dispersed into the resultant solution.

The mixture was charged to a 1 liter autoclave, the air in the autoclave was flushed with nitrogen and hydrogen gas was introduced into the autoclave to obtain a pressure of 50 atmospheres.

Nest, the autoclave was put on a concussion rack throughout the entire reaction. The content of the autoclave was heated to 350° C for 2.5 hours, the precipitated mass was then removed from the autocalve, filtered, water-washed and dried at room temperature.

The product was black and acicular and its magnetic properties were: Hc 480 oe, Br/$\rho$ 675 emu/g, Bm/$\rho$ 1,350 emu/g and Rs 0.50.

Example 6.

70 grams of $CoSO_4 \cdot 7H_2O$ and 10 grams of $NiSO_4 \cdot 7H_2$were dissolved into 400 cc of distilled water. The thus obtained solution was added to 150 cc of 12 N ammonia water and mixed.

10 grams of $\alpha$-FeOOH, whose major axis was 0.75$\mu$ and the acicular ratio was 6, were mixed and kneaded with water and the mixture was added to the previously prepared solution, said $\alpha$-FeOOH functioning as cores and being dispersed into the mixed solution. The mixture obtained was charged to a 1 liter stainless steel autoclave, the air in the autoclave was flushed with hydrogen and more hydrogen gas was introduced to a final pressure of 55 atmospheres. The autoclave was heated to 300° C for 7 hours by an electric furnace, while simultaneously being stirred, and then cooled by water. The product was removed from the autoclave to be dried at room temperature. The reacted product was black and its magnetic properties were: Hc 1,550 oe, Br/$\rho$ 440 emu/g, Bm/$\rho$ 980 emu/g and Rs 0.45.

Example 7.

35 grams of $CoSO_4 \cdot 7H_2O$, 35 grams of $NiSO_4 \cdot 7H_2O$ and 10 grams of $CuSO_4 \cdot 5H_2O$ were dissolved into 150 cc of distilled water. The solution was added to 150 cc of 12 N ammonia water and stirred. The pH of the mixture was 11.7 at 25° C. 10 grams of magnetite, whose major axis was 0.5$\mu$ and the acicular ratio was 8, were prepared as cores and were mixed and kneaded with a small amount of water in a mortar and the mixture was added to the previously prepared solution, so that the cores were dispersed and suspended. The suspended mixture was charged to a 1 liter stainless steel autoclave, the air in the autoclave was flushed with hydrogen and more hydrogen gas was introduced to reach a pressure of 50 atmospheres. Next, the autoclave was heated to 350° C for 1 hour, with stirring and water-cooled. The reaction product was then removed and the powder obtained was filtered, water-washed and dried at room temperature. The product was black and confirmed by electron microscope to have preserved its original spicular configuration. The spinel phase and the $\alpha$-Co phase were detected by X-ray analysis. The magnetic properties of the product were: Hc 530 oe, Br/$\rho$ 1,000 emu/g, Bm/$\rho$ 1,900 emu/g and Rs 0.53.

Example 8.

35 grams of special grade $CoSO_4 \cdot 7H_2O$ were dissolved in 500 cc of distilled water. 100 cc of first grade 12 N ammonia water were poured into a vessel and mixed with the above-mentioned solution. 10 grams of spicular kaolin, whose major axis was 0.5$\mu$ and the acicular ratio was 6, were prepared as cores and kneaded with a small amount of water in a mortar. After kneading, the kaolin-containing water was added to the previously prepared solution, so that the kaolin cores were dispersed and suspended in the solution. The suspended solution was charged to a 1 liter stainless steel autoclave, the air in the autoclave was exhausted by a vacuum pump and hydrogen gas was introduced to reach a pressure of 30 atmospheres.

The autoclave was heated to 300° C for 3 hours with an electric furnace while stirring. When the reaction was finished, the product was water-cooled and removed from the autoclave. The powder obtained was filtered, washed and dried at room temperature. The product consisted of black-and-gray spicular crystals and the original configuration of cores was preserved.

The magnetic properties of the product were: Hc 560 oe, Br/$\rho$ 530 emu/g, Bm/$\rho$ 890 emu/g, Rs 0.60, and the $\alpha$-phase of the deposited cobalt was detected by X-ray analysis.

Example 9.

10 grams of white granular alumina were used in place of 10 grams of spicular kaolin, all other conditions being the same as in example 8. The reaction product consisted of black-and-gray granular particles with the following magnetic properties: Hc 450 oe, Br/$\rho$ 520 emu/g, Bm/$\rho$ 980 emu/g and Rs 0.53.

Example 10.

10 grams of cubic fine particles, having a mean size of 0.4$\mu$, of Co-ferrite obtained by the coprecipitation method were used in place of 10 grams of spicular kaolin, all other conditions being the same as in example 8. The reaction product consisted of fine particles with the following magnetic properties: Hc 1,780 oe, Br/$\rho$ 940 emu/g, Bm/$\rho$ 1,340 emu/g and Rs 0.70.

Example 11.

35 grams of $CoSO_4 \cdot 7H_2O$ were dissolved into 400 cc of distilled water. 100 cc of 12 N ammonia water were poured into a vessel and the above $CoSO_4$ solution was mixed and stirred with said ammonia water.

10 grams of $\gamma \cdot Fe_2O_3$, whose major axis was 0.8$\mu$ and the acicular ratio was 6, were prepared as cores and kneaded with a small amount of water in a mortar. After kneading, the mixture was added to the previously prepared solution containing $CoSO_4$ and ammonia water to disperse and suspend the $\gamma \cdot Fe_2O_3$ into solution.

The $\gamma \cdot Fe_2O_3$ suspension was charged to a 1 liter autoclave, the air in the autoclave was flushed with nitrogen and hydrogen gas was introduced to reach a pressure of 80 atmospheres.

Then, the autoclave was put on a concussion rack while reaction took place. The content of the autoclave was heated to 350° C for 2.5 hours to promote the reaction. The precipitated mass was removed from the autoclave, filtered, washed and dried at room temperature.

The product consisted of black spicular crystals with the following magnetic properties: Hc 480 oe, Br/$\rho$ 830 emu/g, Bm/$\rho$ 1,500 emu/g and Rs 0.55.

Example 12.

7 grams of Fe-Co-Ni alloy spicular fine particles were used in place of 10 grams of spicular $\gamma \cdot Fe_2O_3$ all other conditions being the same as in example 11. The product were black fine crystals having the original spicular configuration, and the magnetic properties were: Hc 850 oe, Br/$\rho$ 1,310 emu/g, Bm/$\rho$ 1,950 emu/g and Rs 0.67. By heat-treatment of this example, the Bm/$\rho$ was improved by about 30 percent while the Hc was not changed.

Example 13.

10 grams of ESD magnetic powder (Fe-Co alloy) produced by the mercury cathode method were used in place of 10 grams of spicular $\gamma \cdot Fe_2O_3$, all other conditions being the same as in example 11. The magnetic properties of the product were: Hc 870 oe, Br/$\rho$ 1,460 emu/g, Bm/$\rho$ 2,150 emu/g and Rs 0.68. By heat-treatment of this example, the Hc was improved by 30 oe and the Bm/$\rho$ by about 20 percent.

Example 14.

The fine particles obtained in example 1 were put into a quartz boat and were reduced in a hydrogen flow (flow rate 15 l/min) at 350° C for 8 hours. As a result, Fe-Co alloy fine particles were obtained. The magnetic properties of the particles were found to be: Hc 1,300 oe, Bm/$\rho$ 2,030 emu/g, Br/$\rho$ 1,440 emu/g and Rs 0.71.

Example 15.

The fine particles obtained in example 3 were put into a quartz boat and were heat-treated in air at 400° C for 5 hours. The product was acicular and its magnetic properties were: Hc 1,550 oe, Br/$\rho$ 730 emu/g, Bm/$\rho$ 980 emu/g and Rs 0.75. By X-ray analysis, it was confirmed that the crystal structure of the product was a single phase of spinel and the lattice constant was 8.38 A. The Hc was increased about 1.58 times by the treatment.

Example 16.

35 grams of $CuSO_4 \cdot 7H_2O$, 35 grams of $NiSO_4 \cdot 7H_2O$ and 15 grams of $CuSO_4 \cdot 5H_2O$ were dissolved in 400 cc of distilled water, and the solution was mixed with 150 cc of 12 N ammonia water with stirring. 15 grams of No. 3,000 white alumina powder was kneaded with a small amount of water in a mortar. The kneaded alumina was added to the above solution and this mixture was stirred so that the alumina powder was dispersed and suspended. Then, the mixture was charged to a 1 liter stainless steel autoclave, the air in the autoclave was exhausted and hydrogen gas was introduced to reach a pressure of 50 atmospheres. The autoclave was heated and its content was stirred at 350° C for 1 hour, water-cooled and removed. The product was gray and the hexagonal structure of alumina as well as the α-Co phase were detected by X-ray analysis. The magnetic properties of the product were: Hc 350 oe, Bm/ρ 1,100 emu/g and Rs 0.53.

The fine particles obtained were put into a quartz boat and were heat-treated in hydrogen at 300° C for 2 hours. The magnetic properties were: Hc 550 oe and Bm/ρ 1,200 emu/g. This means that the magnetic properties were improved by the heat-treatment.

Example 17.

10 grams of the alloy powder obtained in example 14 were used as cores, the reactant solution and all other conditions being those of example 1. Thus, Co was further deposited on the alloy powder cores.

The particles obtained were put into a quartz boat and heat-treated in hydrogen at 300° C for 10 hours. The magnetic properties of the product were: Hc 1,450 oe, Bm/ρ 1,850 emu/g and Rs 0.76.

Example 18.

Oxalic acid was added to an aqueous solution mixture of iron sulfate and cobalt sulfate, so that iron oxalate and cobalt oxalate were coprecipitated.

The coprecipitate was heat-treated in hydrogen at 300° C for 3 hours and Fe-Co alloy fine particles were obtained. 10 grams of the fine particles were used as cores and were charged to a stainless steel autoclave and processed under the same conditions as in example 2, so that Co layer was deposited on the cores.

The fine particles obtained were then placed into a quartz boat and were heat-treated in hydrogen at 350° C for 15 hours in order to homogenize the composition of the particles. FE-Co alloy particles were produced and the magnetic properties were: Hc 1,200 oe, Bm/ρ 2,100 emu/g and Rs 0.75.

Example 19.

70 grams of a special grade $CoSO_4 \cdot 7H_2O$ were dissolved in 500 cc of distilled water. 160 cc of first grade 12 N ammonia water were poured into a vessel, the $CoSO_4$ solution was added to said ammonia water and the entire mixture was stirred.

10 grams of spicular $\gamma \cdot Fe_2O_3$, whose major axis was 0.5μ and the acicular ratio was 8, were used as cores and were kneaded with 10 cc of distilled water in a mortar. After kneading, the previously mixed solution was added to the kneaded $\gamma \cdot Fe_2O_3$. The mixture obtained was placed into a 1 liter stainless steel autoclave, the air in the autoclave was exhausted by a vacuum pump and hydrogen gas was introduced to a final pressure of 70 atmospheres. Then, the autoclave was heated to 350° C for 3 hours. When the reaction was finished, the autoclave was water-cooled and the product was removed.

The product was black and confirmed by electron microscopic photography to have preserved the original spicular configuration.

The magnetic properties of the product were: Hc 700 oe, Bm/ρ 1,970 emu/g, Br/ρ 1,280 emu/g and Hc 0.65. The spinel phase and α-Co phase were detected by X-ray analysis.

These magnetic particles were mixed with the varnishing materials given in the following Table 1 in a volumetric ratio of 1:1 and kneaded in a ball mill for 48 hours.

TABLE 1

| | |
|---|---|
| above-described magnetic particles | 450g |
| Vinilite V AGH*produced by Union Carbide Co. | 100g |
| solvent** | 750cc |
| D.O.P (dioctyl phtalate) | 10g |
| aerosol (surface active agent) | 1g |

*vinyl chloride acetate copolymer
**mixture of MEK and toluene

After kneading, the magnetic paint was applied to a 37μ thick acetylcellulose base with a doctor blade to form a layer about 12μ thick and then it was dried. The magnetic sheet thus obtained was cut off to a width of 6.3 mm. The magnetic properties of the tape were: Hc 650 oe, φm per sheet of tape 2.1 maxwell and φr 1.2 maxwell, (where φm is the saturated magnetic flux and φr the residual magnetism.)

Example 20.

The magnetic particles produced by the mathod described in example 3 were mixed in a volumetric ratio of 1:1 with the varnishing materials given in the following Table 2 and a kneaded in a ball mill for 48 hours.

TABLE 2

| | |
|---|---|
| magnetic particles | 450g |
| Vinilite V AGH produced by Union Carbide Co. | 120g |
| solvent* | 700cc |
| D.O.P | 9.5g |
| aerosol OT. | 0.8g |

*mixture solvent of MEK and toluene

After kneading, the magnetic paint was applied to a 37μ thick acetylcellulose base with a doctor blade to form a layer about 10μ thick, and then it was dried. The sheet obtained was cut off to a width of 6.3 mm. The magnetic properties of the tape were: Hc 905 oe, φm per sheet of tape 1.5 maxwell and φr 0.8 maxwell.

Example 21.

The magnetic particles obtained by the reaction solution described in example 3 were placed into a quartz boat and reduced in hydrogen at 400° C for 8 hours. Alloy particles having the original spicular configuration were produced. The magnetic properties of the product were: Hc 700 oe, Bm/ρ 1,850 emu/g, Br/ρ 1,100 emu/g and Rs 0.60.

The magnetic particles were mixed and kneaded with the varnishing materials given in Table 2 in a ball mill for 40 hours and the magnetic paint obtained was applied to a 37μ acetylcellulose base with a doctor blade to form a layer about 10μ thick, which layer was then dried. The sheet obtained was cut off to a width of 6.3 mm. The magnetic properties of the tape were: Hc 620 oe, φm 1.85 maxwell and φr 1.3 maxwell.

Example 22.

35 grams of a special grade $CoSO_4 \cdot 7H_2O$ were dissolved in 500 cc of distilled water. 100 cc of first grade 12 N ammonia water were placed into a vessel and mixed with the $CoSO_4$ solution with stirring.

10 grams of acicular kaolin used as cores, the major axis of the kaolin being 0.5μ and its acicular ratio 6, were kneaded with a small amount of water in a mortar. The kneaded mixture was added to the previously prepared $CoSO_4$-containing solution and stirred so that the kaolin particles were well-dispersed. The kaolin dispersion was placed into a 1 liter stainless steel autoclave, into which hydrogen gas was then introduced to give a pressure of 30 atmospheres. The autoclave was heated with an electric furnace at 300° C for 3 hours.

After completion of the reaction, the product was removed from the autoclave, filtered, washed and dried at room temperature. The product was gray-black and its crystal structure was as spicular as the original configuration. The magnetic properties of the product were: Hc 560 oe, Bm/ρ 890 emu/g, Br/ρ 530 emu/g and Rs 0.60. The α-phase of cobalt was detected by X-ray analysis.

The magnetic particles obtained were mixed with the varnishing materials given in Table 2 and kneaded in a ball mill for 40 hours. After kneading, the magnetic paint was applied to a 37μ thick acetylcellulose base to form a layer about 10μ thick, which then was dried. A magnetic sheet was thus obtained which was cut off to a width of 6.3 mm. The magnetic properties of the tape were: Hc 800 oe, φm 1.05 maxwell and φr 0.73 maxwell.

Example 23.

The magnetic particles produced by the method described in example 22 were placed into a quartz boat and heat treated at 400° C for 5 hours. The magnetic properties of the heat-treated particles were: Hc 500 oe, Bm/ρ 950 emu/g, Br/ρ600 emu/g and Rs 0.63. These properties were found to be good for magnetic tape use. The above magnetic particles were then mixed and kneaded with the varnishing materials given in Table 1 in a ball mill for 48 hours. After kneading, the magnetic paint was applied to a 37μ thick acetylcellulose base with a doctor blade to form a layer about 12μ thick, which was then dried. The magnetic sheet thus obtained was cut off to a width of 6.3 mm. The magnetic properties of this tape were: Hc 480 oe, φm 1.25 maxwell and φr 0.85 maxwell.

Example 24.

Acicular magnetic powder of the alloy produced by the method described in example 21 was used as cores and a Co-Ni alloy coating was deposited on these cores by the following method: 40 grams of $CuSO_4 \cdot 7H_2O$ and 40 grams of $NiSO_4 \cdot 7H_2O$ were dissolved in 400 cc of distilled water. This solution was added to 150 cc of 12 N ammonia water and stirred therewith. 15 grams of the above described acicular magnetic particles of Co-Ni alloy were kneaded with a small amount of water in a mortar and this kneaded mixture was added to the ammonia water mixture in order to disperse and suspend the magnetic particles. The suspension obtained was placed into a 1 liter stainless steel autoclave into which hydrogen gas was introduced to a final pressure of 50 atmospheres. The autoclave was heated and its content was stirred with a propeller at 300° C for 3 hours. After the reaction was completed, the autoclave was water-cooled and the particles were removed. The product was black and its crystal structure was acicular. The magnetic properties were: Hc 560 oe, Br/ρ1,340 emu/g, Bm/ρ 2,130 emu/g and Rs 0.63. The magnetic particles obtained were kneaded with the varnishing materials given in Table 1 in a ball mill for 48 hours. After kneading, the magnetic paint was applied to a 37μ acetylcellulose base with a doctor blade to form a layer about 12μ thick, which then was dried. The magnetic sheet thus obtained was cut off to a width of 6.3 mm.

The magnetic properties of the magnetic tape were: Hc 5,150 oe, φm 2.30 maxwell and φr 1.67 maxwell.

As shown in the above examples of the invention, a layer of ferromagnetic metals or alloys of Co or Ni is deposited on fine particle cores of arbitrary configuration and materials having a high coercive force and a high magnetic flux density are obtained, which materials may successfully be used as magnetic recording media or as permanent magnets. Particularly, if the fine particle cores are formed spicularly, spicular magnetic materials are produced and even superior magnetic recording media are obtained by arranging the spicular particles in the scanning direction of the head of a recorder. If the cores are ferromagnetic spicular particles, a greater magnetic flux density is obtained. The materials of this invention are thermally more stable than magnetic oxides and are in a substantially perfectly stable state at room temperature. Although spicular magnetic materials could not be easily produced by prior art processes, now not only spicular but also any desired configuration can be easily achieved because the configuration of the cores remains unchanged during processing. The magnetic properties may be even improved further by heat-treatment and a superior magnetic recording medium for magnetic tapes or drums is thus obtainable.

What we claim is:

1. Method of producing a magnetic material having a core consisting of finely divided particles of arbitrary configuration, which method comprises:

*a.* providing in a pressure vessel an ammoniacal solution containing ions selected from nickel, cobalt and mixtures thereof, said solution having its pH adjusted to the alkaline state;

*b.* suspending in said solution said finely divided core particles of arbitrary configuration;

*c.* pressurizing said vessel with reducing gas to a pressure of at least 50 atmospheres; and

*d.* heating the pressurized vessel to a temperature of from about 250° to about 350° C to effect the deposition of said nickel, cobalt and mixtures thereof upon the said cores while preserving their original arbitrary configuration.

2. The method, according to claim 1, wherein said reducing gas is hydrogen.

3. The method, according to claim 1, wherein said cores are spicular.

4. The method, according to claim 1, wherein said cores are selected from spicular ferromagnetic oxides and spicular water-containing iron oxides.

5. The method, according to claim 1, wherein said cores coated with said nickel, cobalt and mixtures thereof are heat treated in an atmosphere selected from oxidizing and reducing atmospheres.

6. Magnetic material produced by the process of claim 1.

7. Magnetic material produced by the process of claim 5.

* * * * *